United States Patent [19]

Lee et al.

[11] Patent Number: 5,045,609

[45] Date of Patent: Sep. 3, 1991

[54] TOUGHENED, HIGH TEMPERATURE RESIN MATRIX SYSTEM

[75] Inventors: Frank W. Lee, Danville; Kenneth S. Baron, San Ramon; Maureen Boyle, Oakland, all of Calif.

[73] Assignee: Hexcel Corporation, Dublin, Calif.

[21] Appl. No.: 377,166

[22] Filed: Jul. 7, 1989

[51] Int. Cl.[5] .............................................. C08L 75/04
[52] U.S. Cl. .................................. 525/438; 427/386; 428/413; 528/56; 528/73; 528/119
[58] Field of Search .................... 525/438; 528/73, 56, 528/119; 427/386; 428/413

[56] References Cited

U.S. PATENT DOCUMENTS 4,168,364 9/1979 Seltzer et al. ....................... 528/124
4,608,313 8/1986 Hickner et al. ....................... 528/73

*Primary Examiner*—Maurice J. Welsh
*Attorney, Agent, or Firm*—Oblon, Spivak, McClelland, Maier & Neustadt

[57] ABSTRACT

A matrix resin system, for the preparation of composite parts, is comprised of a major amount of cyanate resin and an epoxy resin modified by reaction with an isocyanate. The resin system can be toughened by the addition of thermoplastic material, the toughness improvement being enhanced by the addition of a polyester rubber additive. The modified epoxy resin system is itself a resin having good modulus and Tg characteristics. The resin is cured at temperatures of 250°–400° F. in the presence of a metallic complex catalyst, and OH donor.

16 Claims, No Drawings

TOUGHENED, HIGH TEMPERATURE RESIN MATRIX SYSTEM

FIELD OF THE INVENTION

This invention pertains to a matrix resin system for use in the preparation of matrix/fiber composite materials. A matrix resin system, and modifications thereof, can be combined with oriented fibers to give balanced, high strength products.

BACKGROUND OF THE PRIOR ART

Increasingly, matrix/fiber composite materials are being employed in applications requiring both high performance characteristics, and low weight per strength yield profiles. The increasing demand for improved composite materials, exhibiting good toughness at high temperatures is no where more keenly felt than in the military and commercial aerospace industries. As new applications are identified, new requirements are established which these composite systems must meet.

Composite systems will vary greatly with regard to the matrix resin employed, and the success or failure of this system depends, to a great extent, on the nature of the matrix resin. Both processability and chemical makeup, and the characteristics achieved thereby, are of value. Thus, a low cure time and temperature with relatively simplified processing requirements which shows a good (high) Tg are more desirable than conventional autoclave systems that cure at temperatures of 350° F. and above.

Perhaps the most dominant matrix system currently available is an epoxy/amine type system. These matrix resins are combined with oriented fiber reinforcing means to form a prepreg or other tape form subsequently built up into a fabric. Alternatively, the resin is applied to a previously prepared fabric form. The epoxy/amine systems are generally desirable because of high compressive strength, high modulus and high Tg characteristics. However, these properties are lost, or substantially reduced, when the system is exposed to either moisture or excessive heat. Further, many applications call for a toughened system. To "toughen" the epoxy/amine systems available, a loss in the Tg, or solvent resistance, or some combination, is frequently encountered. Other problems plaguing the industry include the lack of consistency in the production of most systems, and the lack of a single system providing a good balance of necessary properties including relatively high compressive strength, toughness and modulus characteristics, with a good Tg, characteristics which are not extensively reduced when exposed to moisture and/or excessive heat.

Accordingly, it remains a pressing need in the industry to provide a matrix resin system, combinable with oriented reinforcing fibers of high modulus, to give composite materials of exceedingly high strength/weight characteristics, and with a balance of desirable properties.

SUMMARY OF THE INVENTION

In order to meet the above objects, and other objectives made clear below, a matrix resin system suitable for the preparation of composite parts is provided by the polymerization product of an isocyanate-extended polyfunctional epoxy resin, and a dicyanate ester. The performance of this basic system, which gives high compressive strength, a high Tg, high modulus and low water absorption, can be further improved by the addition of a thermoplastic material, to toughen the matrix, and the ultimate composite. To enhance the performance of the thermoplastic additive to the resin system, an enhancement agent, generally a polyester rubber, may be added in small amounts. This increases the toughness advantage realized from the addition of an equivalent amount of thermoplastic resin material.

Thus, a matrix resin system of highly desirable, and balanced, properties that can provide a composite material with Tg well above the required cure temperature is provided by a polymer system comprised of a majority of cyanate (dicyanate ester) and a polyfunctional epoxy. Specific applications, properties, and adaptations can be provided by tailoring the epoxy resin and its functionality to the system. A significant enhancement of toughness, without loss of modulus, is achieved by adding a thermoplastic resin to the system, in the presence of a polyester rubber enhancement agent. Acceptable loadings of thermoplastic material may be achieved through conventional processes. Certain desirable thermoplastics, such as polyethersulfones (PES) which may be difficult to solubilize, can be added to the resin system in quantities up to about 20% by weight without encountering processing problems.

DETAILED DESCRIPTION OF THE INVENTION

The basic monomers of the resin system disclosed herein are a dicyanate ester and a polyfunctional epoxy. The dicyanate ester should be present in a major amount, preferably about 51-70% by weight. The isocyanate-extended epoxy should be present in amounts of about 30-49% by weight, and can be prepared from any of a wide variety of bi, tri or tetrafunctional epoxy resins, and virtually any reactive isocyanate. Characteristics such as viscosity, Tg, color, processability and the like, can be altered by selection of appropriate epoxy and isocyanate systems. When it is desired to add thermoplastic toughening agents to the resin system, an enhancement agent, generally a polyester rubber, is added, in amounts of approximately 1-5 parts, by weight. The addition of the thermoplastic enhancement agent allows significant increases in toughness, without a significant reduction in modulus, as compared to that achieved at the same loadings, without the enhancement agent.

The dicyanate ester employed in the polymer resin system of the invention can be virtually any cyanate ester meeting the general formula A:

$$\text{AR} \begin{matrix} -\text{OCN} \\ | \\ \text{OCN} \end{matrix} \qquad (A)$$

Ar can be virtually any aromatic radical which is free of unshielded groups capable of reacting with the cyanate functionality of the ester. Thus, Ar should be free of amine groups, amide groups, hydroxyl groups and the like. Among preferred commercially available dicyanate esters are those produced by HITeck, under the polymer designation AROCY. Both the B and M series polymers are suitable for use in the invention, as are dicyanate esters recently made available by Dow Corporation. Preparation of the dicyanate esters themselves is straightforward, and known to those of skill in the art. As a general rule, purely from the aspect of reactivity and processability, Ar should comprise at least 6 carbon atoms, and not exceed 100 carbon atoms.

The resin matrix system addressed herein comprises both the dicyanate ester, and an isocyanate-extended epoxy resin, as a second principal element. The extended epoxy resin is prepared from any of a wide variety of epoxy resins, combined with virtually any isocyanate. In distinction from most conventional processes, the extended epoxy resin is prepared by reacting any polyfunctional epoxy resin with virtually any isocyanate, in the absence of any catalyst or solvent. Thus, essentially stoichiometric equivalent amounts of the isocyanate and epoxy resin are added, together, with a previously prepared amount of seed material, which may range from 0-10%, by weight, of the total reaction mixture. At a temperature of 150°-180° C., the reaction goes forward in a time period of about 2 hours-26 hours, dependent on the actual temperature employed, the reactivity of the epoxy resin, and the isocyanate selected.

Particularly preferred epoxy resins include bi, tri and tetrafunctional epoxy resins, for use in the invention. As noted, virtually any isocyanate will react with the epoxy resin to give the desired extended resin component. Because of their greater reactivity, and slightly improved physical properties, aromatic isocyanates constitute a preferred group. However, aliphatic isocyanates, such as hexamethylene diisocyanate may be successfully employed in the invention.

Depending on the ultimate physical and curing properties required, the epoxy resin component may be selected from virtually any multifuntional epoxy resin. Epoxy resins such as MY 0500 and 0510 from Ciba Geigy, and Tactix 742 from Dow Chemical, may be employed. Alternate resin candidates are represented by the Shell Chemical resin series 1071, et. sec. Additionally, other bisphenol A or bisphenol F epoxy resins may be employed.

A particularly preferred modified epoxy resin has been secured from the reaction mixture of 2 equivalents of bisphenol A resin and 0.5 equivalents of toluene diisocyanate. This modified epoxy resin bears the internal designation 332 T. This reaction product gives superior hot wet properties in the resin system, together with a good modulus. To prepare the 332 T epoxy, the bisphenol A and toluene diisocyanate reactants are combined, as indicated above, in the absence of solvent or catalyst, and maintained at a temperature of 150°-180° C., for a period of 6-26 hours. This reaction time may be reduced by as much as half through introduction of a limited amount of "seed" material, that is previously prepared 332T.

In the resin matrix system of the invention, to secure specific properties, it is frequently desirable to include a minor, but significant percentage of unmodified epoxy resin. Thus, a particularly preferred system includes 55-65% dicyanate ester, such as the HITek polymers noted above, and 40% epoxy resin. The epoxy resin component consists of 30% of the isocyanate-extended epoxy resin product, such as 332 T, and 10% unmodified polyfunctional epoxy, such as MY 720.

It should be further noted that as an epoxy resin, the 332 T resin product is generally superior to known epoxy resins, in providing an epoxy system for superior properties. Thus, as an epoxy resin per se, this reaction product gives better performance values, high Tg, and modulus than either the bisphenol A or MY 720 resins commonly employed in the art.

As previously noted, it is frequently desirable to toughen the matrix resin system by the addition of thermoplastic materials. The addition of thermoplastic materials, per se, to thermosetting matrix resin systems is not new. However, the amount of thermoplastic material that may be conventionally added to any resin matrix system is somewhat limited. The toughness enhancement achieved by the addition of thermoplastic materials to the matrix resin system of the invention disclosed herein can be significantly increased by the addition of an enhancement agent, generally a polyester rubber. One particularly preferred enhancement agent source is comprised of the polyester resin series designated VITEL, available from Goodyear Tire and Rubber Company. These polyester resins, generally known for their suitability for the preparation of polyester fibers for incorporation into fabrics of various types, can be incorporated in the matrix resin system, in about 1-5 parts by weight, of the total system, to significantly improve the increase in toughness realized by the addition of thermoplastic materials. Additionally, the use of the enhancement agent avoids significant reduction in modulus, something frequently encountered in the prior art, when adding toughening thermoplastic agents. Below about 1 part by weight, no significant improvement in the toughening effect is observed. While additions in excess of about 5 parts by weight do not adversely effect the system, no significantly improved response is observed.

In general, the thermoplastic toughening agent can be incorporated in amounts up to 20% by weight, of the total system, generally 5-20%. Certain thermoplastics, including polyamides and the like, can be dissolved and included in the system directly. Other thermoplastics are difficult or impractical to dissolve, such as polyethersulfone, a particularly preferred additive. Thus, the only commonly available, low-boiling solvent for PES which is immiscible with water is 1,1,2-trichloroethane. This solvent is a suspected carcinogen, and boils at a temperature substantially in excess of water, at about 100°-115° C. Such thermoplastics may be generally added to the matrix resin dry.

Employing the enhancement agent, and the addition of a thermoplastic toughening agent to the matrix resin system of this invention, toughness can be increased by about 30%, with less than a 5% drop in modulus, and maintenance of the other desirable characteristics of the resin system identified.

The matrix resin system may be applied to oriented fibers, or "uni" layers to provide a conventional prepreg tape, or alternatively may be applied to a previously prepared fabric form, and directly molded to provide a composite article. Cure temperatures range from about 250°-400° F., depending on the specific prepolymer system, and the characteristics of the composite article to be prepared. The resin matrix system is cured in the presence of a metallic complex catalyst, such as a catalyst employing Co, Cr, Cu, Zn, Sn, Pb, Mn, Ni or Fe ions. The catalyst is present, as a metal ion, in a range of about 0.01-1.0 pph. The metallic complex can be any of a variety of conventionally available complexes, such as an acac complex, napthalate, or octoate solvated complex. Polymerization requires a hydroxyl source, such phenol present in an amounts of about 0.1-6 pph. Other OH contributors would include benzyl alcohol, and similar known substances.

The resulting, cured composite article exhibits excellent modulus toughness, and strength characteristics, which are not significantly reduced by exposure to moisture and/or excessive heat. It should be noted that the Tg of the system is significantly above its cure temperature, allowing the preparation of composite parts to meet a variety of critical applications in the aerospace industry. The preparation of these parts can be achieved at processing temperatures, and using equipment, conventionally available, and used for epoxy/amine systems currently available.

These systems may be cured at about 350° F. with variable ramp rates and optional dwell times. A typical ramp rate is about 3.5° F. (2° C.)/min. Cure period is about 2 hours. In general, a below cure dwell time will be used to improved fiber wet out.

EXAMPLE 1

Procedure 1:

A jacketed vessel fitted with condenser, thermocouple and a steel stirrer was charged with two equivalents (100 g) of a bifunctional epoxy (DER 332) and 0.5 equivalents (12.5 g) of a diisocyanate (TD). Five percent of previously reacted material (5.9 g) was also added at this point. The reactants were heated with stirring at a rate of 5° C./minute to a temperature 165° C. (+/10° C.). This temperature was maintained for a period of 6-8 hours at which time IR shows that all of the isocyanate has been consumed. The resin was then decanted and stored.

Procedure 2:

A jacketed kettle with both heating and cooling capability, a high shear dispersion stirrer, thermocouple and a nitrogen bleed was charged with 80 parts of an aryl dicyanate monomer sold under the trade name AroCy B-10. The kettle was heated at a rate of 5° C. per minute to 120° C. Twenty parts of a powder grade of polyether sulfone (PES) that had been dried per manufacturers, instructions was then slowly added with stirring. A nitrogen atmosphere was maintained throughout the dissolution. The mix was held at a temperature of 120° C. (+/10° C.) for approximately 1 hour until all of the thermoplastic had dissolved. The mixture was decanted and stored.

Procedure 3:

A jacketed vessel fitted with condenser, thermocouple and vacuum capability was charged with 100 parts of a tetrafunctional epoxy resin (MY-720) and 17.01 parts of polyester rubber. The kettle was heated to 85°-90° C. with stirring and 20 parts of solvent (MEK) were added. This brought the viscosity of the mix down substantially and rapid stirring commenced for a period of approximately one half hour until all of the rubber had dissolved into the resin (the resin became opaque). The solvent was then removed by vacuum and the resin decanted. During solvent removal the resin temperature was allowed to rise to 110° C.

The products from procedures 1 through 3 were blended together at amounts of 30.00, 55.00 and 14.72 parts (respectively) in a vessel with both heating and cooling capability. An additional amount (12.42 grams) of cyanate prepolymer (AroCy B-30) was also added. The mix temperature was 100° C. (+/10° C.). When the resins were thoroughly homogeneous the temperature of the kettle was dropped to below 80° C. At this point the formulation was catalyzed with 1.28 parts of a 0.1 : 1.0 mixture of Copper AcAc dissolved in Nonylphenol. This resin may be stored in an airtight container below 2° C. for several months before use.

The resin was impregnated onto unidirectional carbon fiber (T-40) using normal hot melt methods. Impregnation temperature was 65° C.

Panels were fabricated, vacuum bagged at 30 mm Hg to debulk, and cured in an autoclave under 90 psi pressure. The ramp rate used was 2° C. (3.5° F.)/minute and an hour dwell at 121° C. (250° F.) was inserted to increase flow. Cure temperature was 177° C. (350° F.) for two hours. Laminates were then tested for Short Beam Shear at a 4:1 span per ASTM D-2344 and Ultimate Compressive Strength using tabbed specimens as described in ASTM D-3039. Compressive values are normalized to 64% fiber volume. Wet conditioning of panels included a two week water soak at 160° F. Results are listed below at various temperatures:

| | |
|---|---|
| SBS RT | 16.4 |
| SBS 200° F. | 13.2 |
| SBS 270° F. | 10.9 |
| SBS RT (wet) | 14.9 |
| SBS 200° F. (wet) | 10.6 |
| 0° Compressive Strenth RT | 275.0 |
| 0° Compressive Strength 200° F. | 232.1 |
| 0° Compressive Strength RT (wet) | 256.2 |
| 0° Compressive Strength 200° F. (wet) | 226.1 |

If an increase in compression strength is desired, the panels may be postcured for one hour at 204° C. (400° F.).

EXAMPLE 2

In this formulation all resins were the same with the exception that PES was replaced by Matramid 5218. The substitution was made on a weight basis. All processing parameters remained constant.

| | |
|---|---|
| SBS RT | 15.1 |
| SBS 200° F. | 12.8 |
| SBS 270° F. | 10.3 |
| SBS RT (wet) | 15.6 |
| SBS 200° F. (wet) | 10.5 |
| 0° Compressive Strength RT | 280.2 |
| 0° Compressive Strength 200° F. | 236.7 |
| 0° Compressive Strength RT (wet) | 276.9 |
| 0° C. Compressive Strength 200° F. (wet) | 230.8 |

Once again, the compressive strengths may be increased by a postcure.

The above invention has been described with reference to both general characteristics and specific embodiments. In particular, various isocyanate, epoxy resins and dicyanate esters have been identified, without limitation. The use of other alternative reactants and resins to achieve similar results, will occur to those of ordinary skill in the art without departing from the invention as defined by the claims appended hereto.

What is claimed is:

1. A matrix resin system suitable for incorporation in a matrix resin/oriented fiber composite material, said resin system comprising:
   A) a dicyanate ester, present in a major amount, and
   B) an isocyanate-extended epoxy, said extended epoxy being obtained by recovering the reaction product of a mixture of an isocyanate and a polyfunctional epoxy resin, mixed at a temperature of 150°-180° C., for a period of time of 2-26 hours.

2. The epoxy resin system of claim 1, wherein said resin further comprises a polyfunctional epoxy resin.

3. The resin system of claim 1, wherein said component B is the reaction product of bisphenol A epoxy resin, and toluene diisocyanate.

4. The resin system of claim 1, wherein said system further comprises a polyester rubber in the amount of 1-5 parts, by weight, and a thermoplastic resin in an amount up to 30% by weight of the entire system.

5. The system of claim 4, wherein said thermoplastic resin is a polyethersulfone.

6. A method of preparing an isocyanate-extended epoxy resin, comprising:
   1) preparing a mixture consisting essentially of a polyfunctional epoxy resin, an isocyanate and a previously prepared amount of said isocyanate-extended epoxy resin as seed material,
   2) heating said mixture to a temperature of 150°-180° C. for a period of 2-26 hours in the absence of a solvent or catalyst, and
   3) recovering said isocyanate-extended epoxy resin from said reaction mixture.

7. The process of claim 6, wherein said epoxy resin is a bisphenol A resin.

8. The process of claim 6, wherein said isocyanate is an aromatic isocyanate.

9. The process of claim 8, wherein said aromatic isocyanate is toluene diisocyanate.

10. A fiber/resin matrix composite material, comprised of:
    A) oriented fibrous reinforcing material,
    B) the matrix resin system of claim 1, said composite being cured at a temperature of 250°-400° F. in the presence of a metal ion catalyst and a OH donor.

11. The composite of claim 10, wherein said catalyst is present as a metallic complex in a solvated system, in amounts of 0.1-0.5 pph, as metal ion, and said OH donor is present in amounts of 0.1-6 pph.

12. The composite of claim 10, wherein said catalyst is selected from the group consisting of Co, Cr, Cu, Zn, Sn, Pb, Mn, Ni, Fe and mixtures thereof.

13. A method of preparing a oriented fiber reinforced matrix resin composite material comprising:
    a) saturating a body comprised of oriented fibers with the resin system of claim 1, and
    B) curing said saturated body at a temperature of 250°-450° F. in the presence of a metallic catalyst and a hydroxyl donor until said resin until said resin has reached a satisfactory percent of cure.

14. The process of claim 13, wherein said saturated body is exposed to said temperature while maintained under pressure.

15. The process of claim 13, wherein said fibrous body is a single layer of unidirectional fiber.

16. The process of claim 12, wherein said fibrous body is a previously prepared multi-layer fibrous form of shape corresponding to the composite part.

* * * * *